United States Patent
Zhang et al.

(10) Patent No.: US 11,729,068 B2
(45) Date of Patent: Aug. 15, 2023

(54) RECOMMEND TARGET SYSTEMS FOR OPERATOR TO ATTENTION IN MONITOR TOOL

(71) Applicant: International Business Machines Corporation, Armonk, NY (US)

(72) Inventors: Tian Jiao Zhang, Xi'an (CN); Yuan Feng, Beijing (CN); Yan Yan Han, Xi'an (CN); Su Li Hou, Beijing (CN); Xue Ying Zhang, Xi'an (CN); Jing Xu, Xi'an (CN); Ling Zhuo, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/470,786

(22) Filed: Sep. 9, 2021

(65) Prior Publication Data

US 2023/0084737 A1    Mar. 16, 2023

(51) Int. Cl.
*H04L 41/18* (2022.01)
*G06N 20/00* (2019.01)
*H04L 67/50* (2022.01)

(52) U.S. Cl.
CPC .......... *H04L 41/18* (2013.01); *G06N 20/00* (2019.01); *H04L 67/535* (2022.05)

(58) Field of Classification Search
CPC ........ H04L 41/18; H04L 67/535; G06N 20/00
See application file for complete search history.

(56) References Cited

U.S. PATENT DOCUMENTS

| | | | |
|---|---|---|---|
| 7,251,584 B1 | 7/2007 | Perazolo | |
| 9,871,905 B1* | 1/2018 | Habiger | ............... H04L 67/535 |
| 10,223,727 B2 | 3/2019 | Hsiao | |
| 10,613,962 B1 | 4/2020 | Delange | |
| 2009/0006365 A1* | 1/2009 | Liu | ........ G06F 16/951 |
| | | | 707/999.005 |
| 2011/0131224 A1* | 6/2011 | Bodin | ........ G06Q 30/02 |
| | | | 707/758 |
| 2012/0005215 A1* | 1/2012 | Chow | ........ G06Q 50/01 |
| | | | 707/748 |

(Continued)

FOREIGN PATENT DOCUMENTS

CN        104834729 A        8/2015

OTHER PUBLICATIONS

Anonymously, "Smarter Monitoring Tool (Reactive and Proactive) for On-Premises or Cloud/MultiCloud IT Environments," IP.com No. IPCOM000263873D, Oct. 13, 2020, 5 pages.

*Primary Examiner* — Austin J Moreau
*Assistant Examiner* — Chhian (Amy) Ling
(74) *Attorney, Agent, or Firm* — VanLeeuwen & VanLeeuwen; Kimberly Zillig

(57) ABSTRACT

An approach is provided in which the approach captures a first user activity log of a first user accessing multiple systems and captures a set of second user activity logs of a set of second users accessing the multiple systems. The approach determines a set of system monitoring preferences based the first user activity log and the set of second user activity logs, and scores the multiple systems based on the set of system monitoring preferences. The approach generates a recommended system monitoring list based on the scored multiple systems, and transmits the recommended system monitoring list to the first user.

20 Claims, 10 Drawing Sheets

(56) References Cited

U.S. PATENT DOCUMENTS

| | | | |
|---|---|---|---|
| 2013/0226837 A1* | 8/2013 | Lymberopoulos | ............................ G06F 16/9574 706/12 |
| 2013/0318015 A1* | 11/2013 | Dutta | ..................... G06Q 30/02 707/731 |
| 2016/0345062 A1* | 11/2016 | Klappert | ............... H04L 67/306 |
| 2016/0358065 A1* | 12/2016 | Gedge | .................... G06N 20/00 |
| 2018/0365093 A1 | 12/2018 | Musuvathi | |
| 2019/0205839 A1* | 7/2019 | Dotan-Cohen | ....... H04L 67/535 |
| 2019/0370615 A1* | 12/2019 | Murphy | ................... G06N 5/04 |
| 2021/0073658 A1 | 3/2021 | Poole | |
| 2021/0266639 A1* | 8/2021 | Bagga | ............... H04N 21/4583 |

\* cited by examiner

500 →

| Activity ID | Day | Weekday | Hour | Gap time to last access |
|---|---|---|---|---|
| 1 | 26 | Tuesday | 10:00 | 4 hours |
| 2 | 22 | Friday | 17:00 | 4 hours |
| 3 | 19 | Tuesday | 10:00 | 72 hours |

510 →

| Now | Day | Weekday | Hour | Gap time to last access | Prob |
|---|---|---|---|---|---|
| 2021/3/26/10:55 | 26 | Tuesday | 10:00 | 4 hours | 0.02 |

520 →

| DB | Last Access Gap | Access Count | Online Minutes |
|---|---|---|---|
| db1 | 1 day ago | 10 | 20 |
| db2 | 3 days ago | 5 | 60 |
| db3 | 5 days ago | 1 | 5 |

530 →

| Metric | Range | Score |
|---|---|---|
| Last Access | 1 day ago | 5 |
|  | 3 days ago | 4 |
|  | 5 days ago | 3 |
|  | 1 week ago | 2 |
|  | 1 month ago | 1 |
| Frequency | 0 | 1 |
|  | 5 | 2 |
|  | 10 | 3 |
|  | 30 | 4 |
|  | >30 | 5 |
| Online Time | 0 | 1 |
|  | 30 | 2 |
|  | 60 | 3 |
|  | 90 | 4 |
|  | 120 | 5 |

| DB Name | Eval. Wkday | Eval. Time Slot | Elap. time from restart (min) | Alert Count | Elap. time since last access (min) | Thrpt | Resp. Time (ms) | Wait time spend ratio | Hit Ratio | Table Space used ratio | User | Acc. Time | Dur. (min) |
|---|---|---|---|---|---|---|---|---|---|---|---|---|---|
| DB1 | 1 | 9 | 3 | 3 | -1 | 5k | 1.1 | 0.21 | 0.10 | 0.56 | user 1 | 9:01 | 1 |
| DB2 | 1 | 10 | 10000 | 1 | 5000 | 10M | 0.003 | 0.1 | 0.80 | 0.80 | user 2 | 10:30 | 5 |
| DB1 | 2 | 10 | 600 | 0 | 560 | 500k | 0.5 | 0.3 | 0.50 | 0.80 | user 1 | 10:32 | 16 |

610 ⟶

| DB Name | Eval. Wkday | Eval. Time Slot | Elap. time from restart (min) | Alert Count | Elap. time since last access (min) | Thrpt | Resp. Time (ms) | Wait time spend ratio | Hit Ratio | Table Space used ratio | ... |
|---|---|---|---|---|---|---|---|---|---|---|---|
| DB1 | 2 | 9 | 4800 | 0 | -1 | 5k | 1.1 | 0.21 | 0.50 | 0.45 | ... |
| DBn | 2 | 23 | 2340 | 0 | -1 | 2M | 0.004 | 0.001 | 0.95 | 0.95 | ... |

| User Name | System Admin | DB Admin | DB Performance Tuning | DB Apps Developer | Region | Count of db |
|---|---|---|---|---|---|---|
| user 1 | 1 | 1 | 1 | 1 | Reg1 | 100 |
| user 2 | 1 | 1 | 1 | 0 | Reg2 | 230 |
| user 3 | 0 | 1 | 0 | 0 | Reg1 | 560 |
| ... | ... | ... | ... | ... | ... | ... |
| user n | 0 | 0 | 1 | 1 | Reg3 | 3 |

*FIG. 9*

RECOMMEND TARGET SYSTEMS FOR OPERATOR TO ATTENTION IN MONITOR TOOL

BACKGROUND

Administrators use cloud management tools to control and orchestrate products and services that operate in a cloud. Cloud management tools provide administrators the ability to access resources, automate processes, make adjustments as needed, and monitor usage and cost. Cloud management tools also allow administrators to maintain flexibility and scalability while being able to quickly adapt to changing environments.

Cloud management tool software typically deploys into existing cloud environments as a virtual machine (VM) that includes a database and a server. The server communicates with application programming interfaces (APIs) to connect the database and virtual resources, cloud resources, and/or container-based resources interacting within the cloud. The database collects information on how the virtual or cloud infrastructure is performing and sends analyses to a web interface where the cloud administrator can visualize and analyze cloud performance.

BRIEF SUMMARY

According to one embodiment of the present disclosure, an approach is provided in which the approach captures a first user activity log of a first user accessing multiple systems and captures a set of second user activity logs of a set of second users accessing the multiple systems. The approach determines a set of system monitoring preferences based the first user activity log and the set of second user activity logs, and scores the multiple systems based on the set of system monitoring preferences. The approach generates a recommended system monitoring list based on the scored multiple systems and transmits the recommended system monitoring list to the first user.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 5 is an exemplary diagram depicting various tables that include data utilized by system monitoring recommendation tool 300 to generate preferred pace scores and interests scores;

FIG. 6 is an exemplary diagram depicting various tables of collected dynamic features from multiple systems according to access;

FIG. 9 is an exemplary diagram depicting a table with data for computing user similarities based on profile data and access rates.

DETAILED DESCRIPTION

Figure 1:
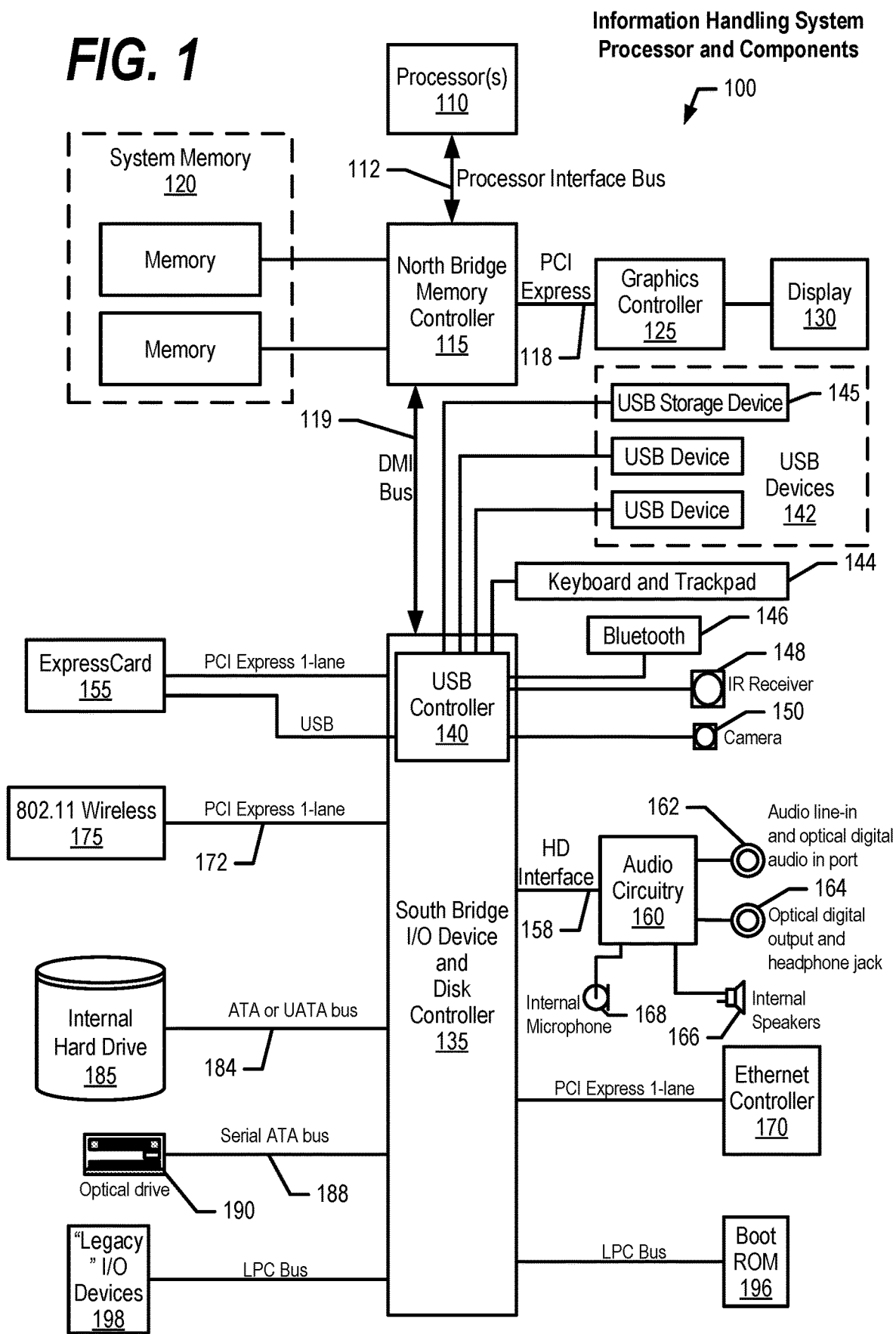
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wirelessly communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
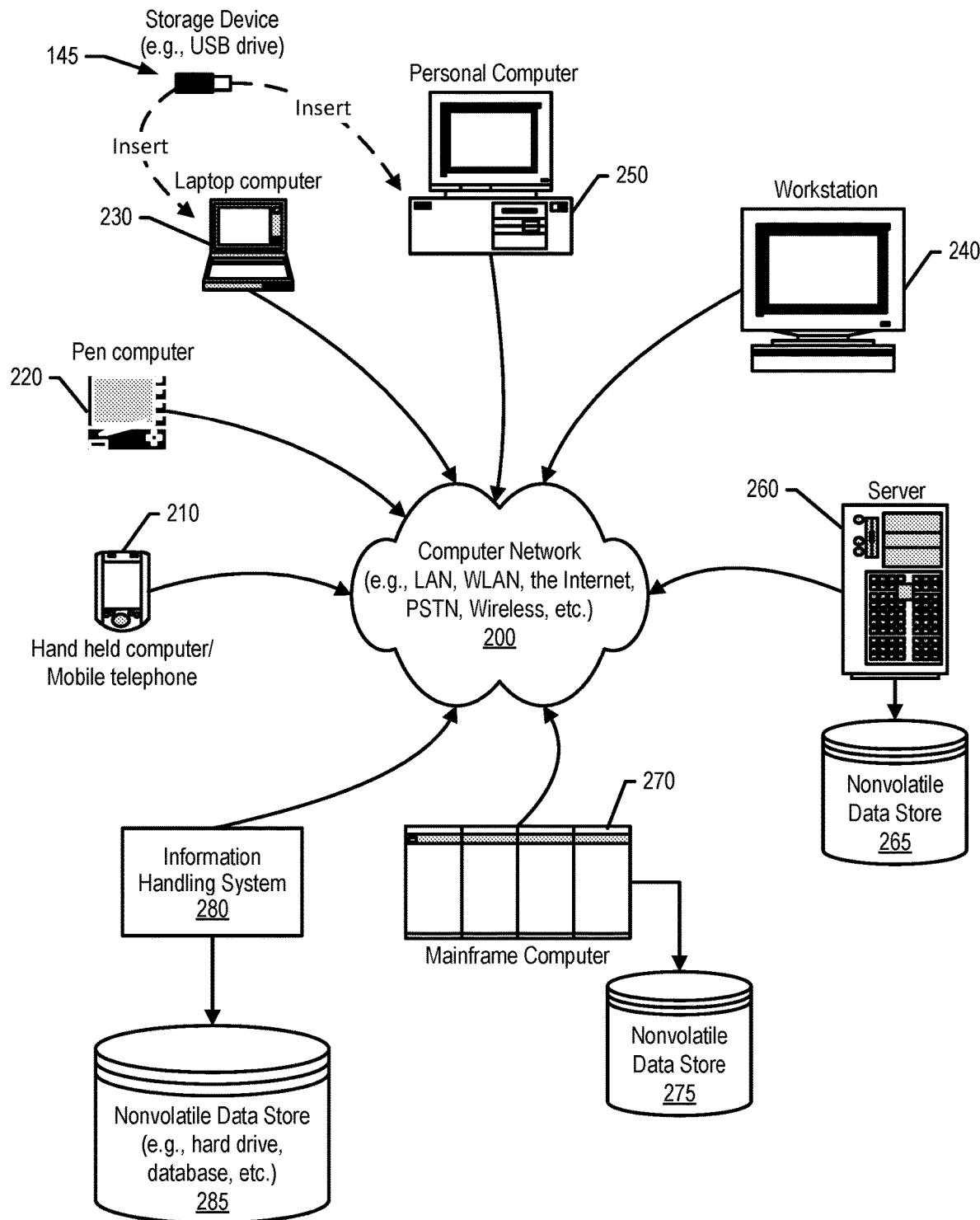
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, cloud management software allows a cloud administrator to visualize and analyze cloud performance. A challenge found, however, is that for an administrator, also referred to herein as an "operator" or a "user," the administrator is responsible for monitoring dozens, hundreds, or even thousands of systems using a centralized monitor/management tool. The cloud management tool typically lists some systems with real-time alerts or notifications to inform the administrator to prioritize handling the alerts or notifications. However, the administrator may be interested in other systems at various points in time and has no convenient mechanism to view the other systems' health status. To complicate the challenge, a junior administrator may not know how to find certain systems and proactively check their health status.

FIGS. 3 through 10 depict an approach that can be executed on an information handling system that combines multiple sources of information across multiple systems and uses artificial intelligence (AI) approaches to generate a recommended system monitoring list for a user to process. The approach generates the recommended system monitoring list by learning from similar users' activities log on similar systems based on clustering system dynamic features in timeslots with time decay considerations.

In one embodiment, the approach leverages a kernel density algorithm on activity time slots and gap times to identify the user's preferred activity time pattern for individual systems and make recommendations based on the user's own pace. In another embodiment, the approach self-learns from the user's click responses as feedback to improve a recommendation machine learning model.

Figure 3:
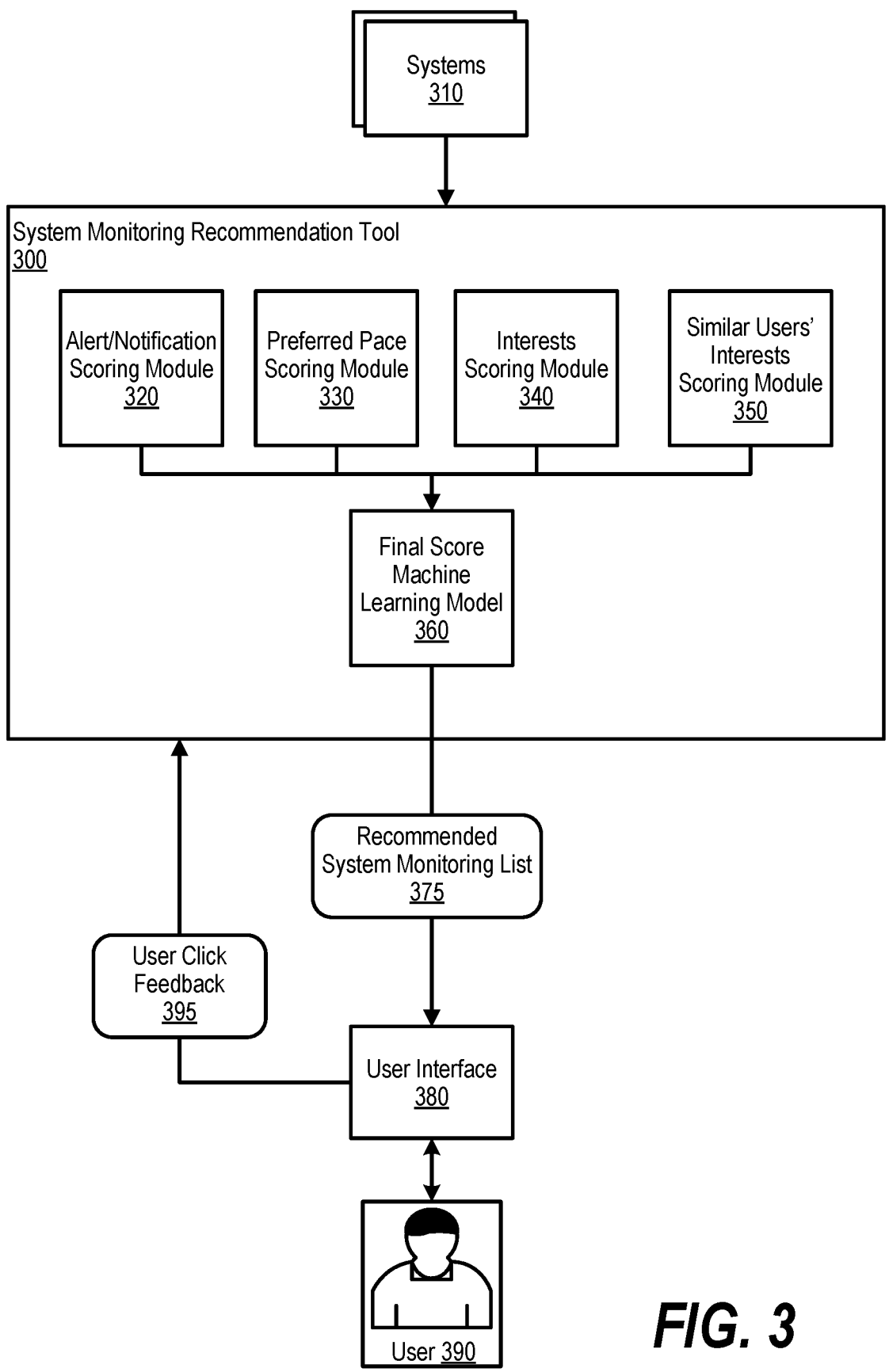
FIG. 3 is an exemplary diagram depicting a system monitoring recommendation tool providing a recommended system monitoring list to a user.

FIG. 3 is an exemplary diagram depicting a system monitoring recommendation tool that monitors multiple systems and generates a recommended system monitoring list.

As discussed in detail herein, system monitoring recommendation tool 300 captures a user activity log of user 390 accessing systems 310, and captures a set of similar users' activity logs also accessing systems 310. System monitoring recommendation tool 300 then determines a set of system monitoring preferences based the captured activity logs and scores systems 310 based on the set of system monitoring preferences.

In one embodiment, system monitoring recommendation tool 300 computes four scores using four different criteria for each one of systems 310. FIG. 3 shows four modules for scoring, which are alert/notification scoring module 320, preferred pace scoring module 330, interests scoring module 340, and similar users' interests scoring module 350. System monitoring recommendation tool 300 generates recommended system monitoring list 375 based on the set of system monitoring preferences and transmits recommended system monitoring list 375 to user interface 380 for user 390 to process.

In one embodiment, system monitoring recommendation tool 300 evaluates user 390's activity log and determines system monitoring preferences, such as determining that i) user 390 and/or the similar users prefer to monitor systems 310 that generate alerts and/or notifications; ii) user 390 and/or the similar users prefer to monitor systems 310 during a particular times during the day/week; iii) user 390 and/or the similar users prefer to monitor a given system for a particular time duration; and etc.

As discussed in detail below, alert/notification scoring module 320 receives alert/notification numbers from one of systems 310 and outputs a "1" if the alerts/notification is greater than or equal to 1, and outputs a "0" otherwise. Preferred pace scoring module 330 extracts time relative features; trains a density model with access time features, and scores a current time using the density model to determine a probability of access. Preferred pace scoring module 330 outputs a "1" if the score current time probability is in the top N %, and outputs a "0" otherwise (see FIG. 5 and corresponding text for further details).

Interests scoring module 340 extracts a gap time to last activity and scores on multiple aspects. Interest scoring module 340 generates an output that is a weighted sum of up to three aspects scores (see FIG. 5 and corresponding text for further details). Similar users' interests scoring module 350 scores recommendations based on other's behavior having a role similar to user 390. The similar role may be embodied as a refined collaborative filtering (CF) algorithm to score access probability for interested systems. In one embodiment, similar users' interests scoring module 350 monitors experienced users that explore systems according to vulnerability or hotness according to the similar user's domain expertise. In this embodiment, system monitoring recommendation tool 300 learns patterns from the historical data of other users in similar roles and applies the learning to the interested systems.

Final score machine learning model 360 receives outputs from modules 320, 330, 340, and 350, and generates a final score using initially weighted sums from the four scores. Final score machine learning model 360 then sorts the final list and provides recommended system monitoring list 375 to user interface 380 for user 390 to utilize.

User interface 380 tracks user clicks from user 390 to capture user 390's actions based on recommended system monitoring list 375, and sends user click feedback 395 to system monitoring recommendation tool 300. In turn, in one embodiment, system monitoring recommendation tool 300 retrains final score machine learning model 360 according to user click feedback 395 to improve precision and sorting of future recommended system monitoring lists (see FIG. 10 and corresponding text for further details).

Figure 4:
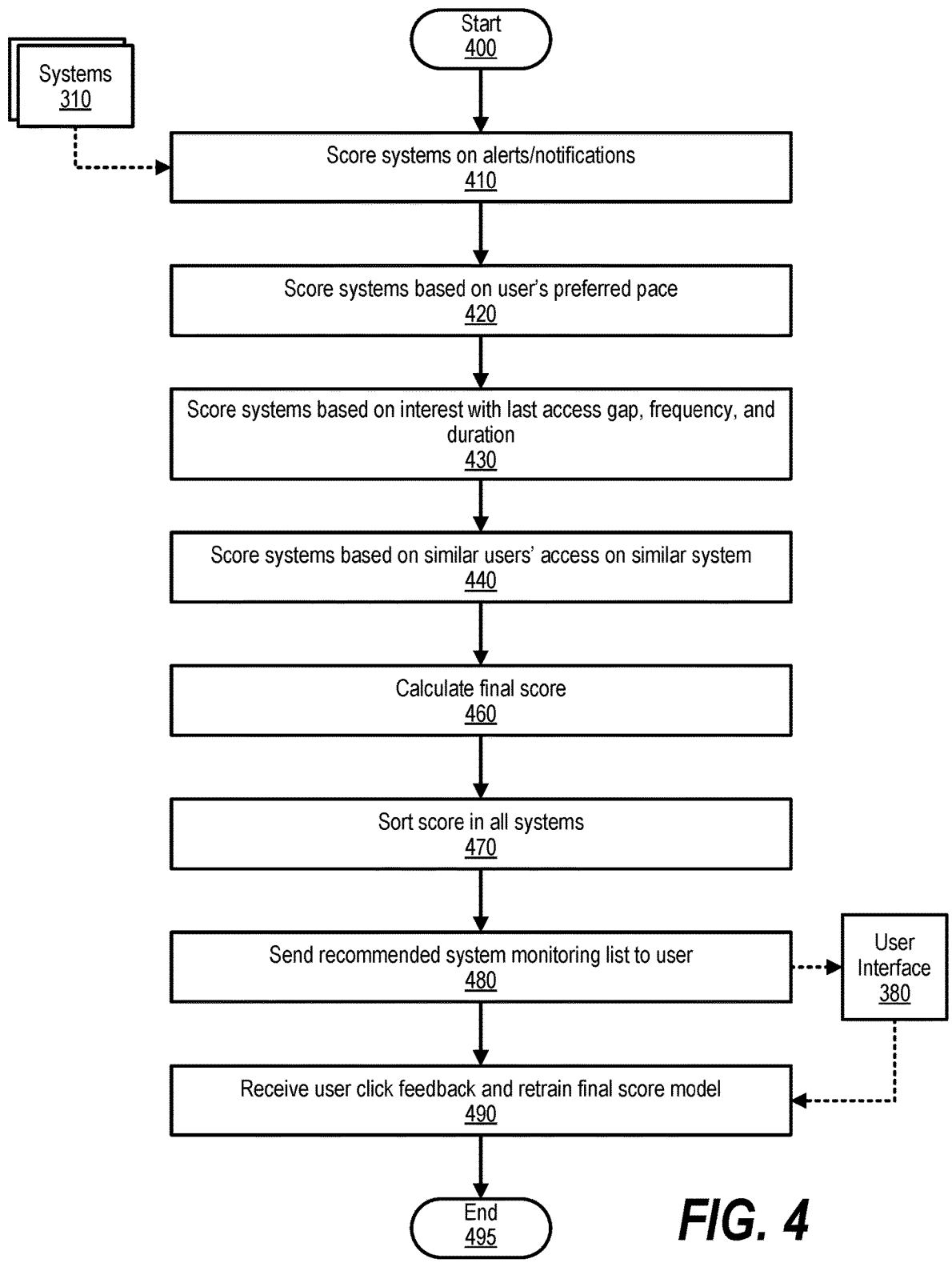
FIG. 4 is an exemplary flowchart showing steps taken to score multiple systems and generate a recommended system monitoring list to provide to a user.

FIG. 4 is an exemplary flowchart showing steps taken to score multiple systems and generate a recommended system monitoring list to provide to a user. FIG. 4 processing commences at 400 whereupon, at step 410, the process scores each of systems 310 based on alerts/notifications (alert/notification scoring module 320).

At step 420, the process scores each of systems 310 based on user 390's preferred pace (preferred pace scoring module 330, see FIG. 5 and corresponding text for further details). At step 430, the process scores each of systems 310 based on interest with last access gap, frequency, and duration (interests scoring module 340, see FIG. 5 and corresponding text for further details).

At step 440, the process scores each of systems 310 based on similar users' access on similar systems (similar users' interest scoring 350). In one embodiment, the process uses a function to compute recommendations from similar users' behavior with similar roles. In this embodiment, the function utilizes i) other users' access log; ii) system features in timeslots with access/no access; and iii) users' features to compute a score, where the function is embodied as a refined collaborative filtering (CF) algorithm to score the access probability for user 300's interested systems.

In another embodiment, the collaborative filter algorithm is aligned to monitor the purpose of systems 310 and use dynamic features in recent time slots as target items rather than monitor a system with static features. In this embodiment, system monitoring recommendation tool 300 clusters large amounts of system dynamic features within various time slots and decreases matrix calculations in the collaborative filter. System monitoring recommendation tool 300 also considers cluster interest with access counts in clusters and cluster element counts, and adds a time decayed function to prioritize recent patterns (see FIGS. 7, 8, and corresponding text for further details).

In yet another embodiment, experienced users explore systems 310 according to vulnerability or hotness according to user 300's domain expertise. In this embodiment, system monitoring recommendation tool 300 learns patterns from such historical data of other users' in similar roles and applies the learned patterns to user 300's interested systems.

Figure 10:
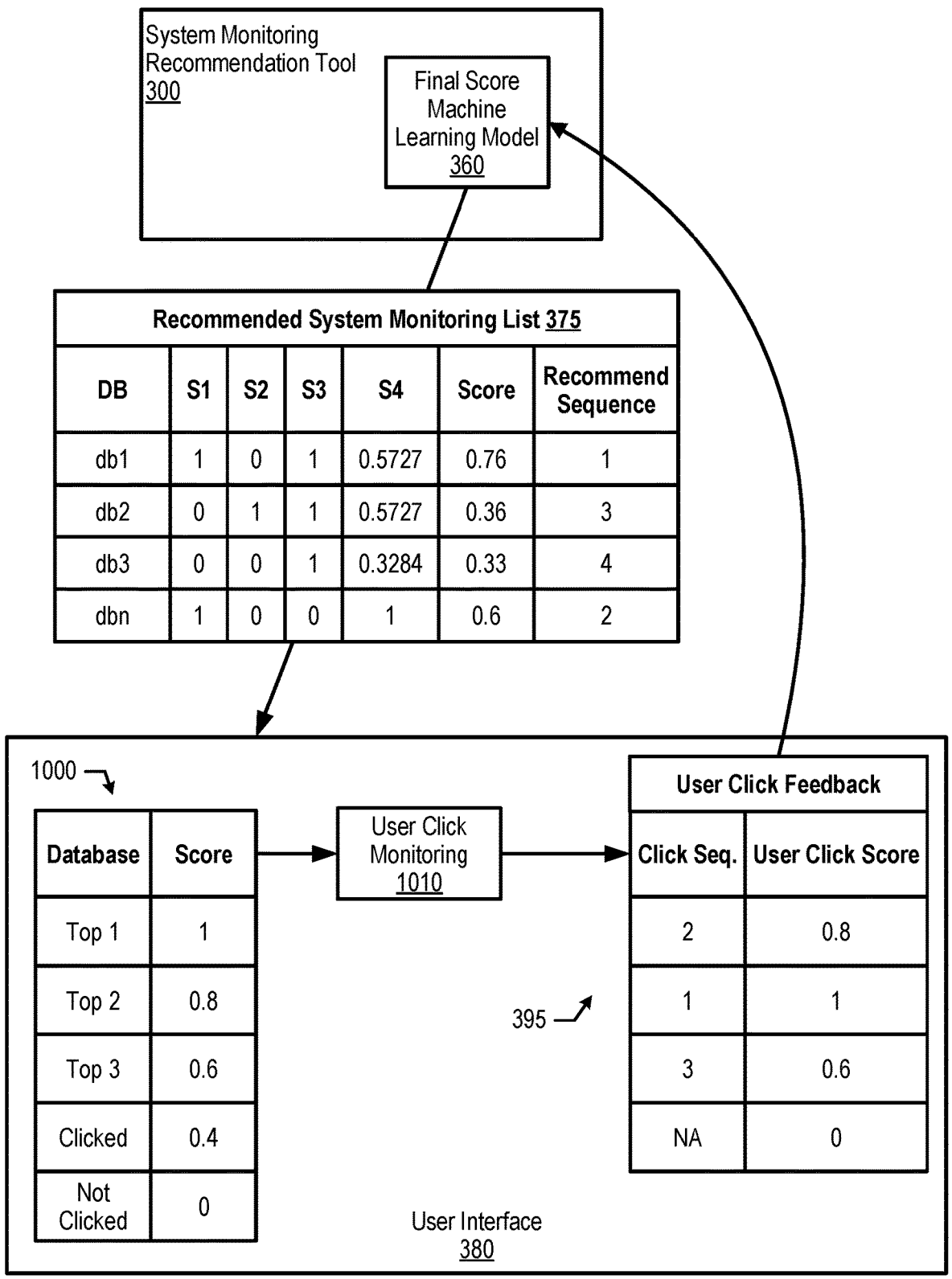
FIG. 10 is an exemplary diagram depicting system monitoring recommendation tool 300 computing a final score and retraining a final score machine learning model based on captured user clicks.

At step 460, the process calculates a final score based on the individual scoring from steps 410-440 and, at step 470, the process sorts the scores in all systems to generate recommended system monitoring list 375 (see FIG. 10 and corresponding text for further details).

At step 480, the process sends recommended system monitoring list 375 to user interface 380 for user 390 to utilize. At step 490, the process receives user click feedback captured by user interface 380 and retrains final score machine learning model 360 accordingly (see FIG. 10 and corresponding text for further details). FIG. 4 processing thereafter ends at 495.

FIG. 5 is an exemplary diagram depicting various tables that include data utilized by system monitoring recommendation tool 300 to generate preferred pace scores and interests scores based on user 390's past usage and access to systems 310.

Tables 500 and 510 correspond to preferred pace scoring module 330. Table 500 shows time relative features extracted by system monitoring recommendation tool 300 for user 300. System monitoring recommendation tool 300 trains a density model with access time features (e.g., multivariate kernel density estimation (KDE) model) where:

kde_model=kdeMultivariate.fit(access time features).

Then, system monitoring recommendation tool 300 scores the current time with the density model to compute a current time probability score, where:

prob=kde_model.sample(now).

Table 510 includes a probability column of the score output where, in one embodiment, if the current time probability score is in the top N % probability, then system monitoring recommendation tool 300 assigns a "1." Otherwise, system monitoring recommendation tool 300 assigns a "0."

Tables 520 and 530 correspond to interests scoring module 340, which scores based on interests with last access gaps, frequencies, and durations. System monitoring recommendation tool 300 extracts gap times to last activity and counts the number of accesses to particular databases by user 390 and a total online time in a time period, such as the past one month. System monitoring recommendation tool 300 then generates table 520.

System monitoring recommendation tool 300 then computes scores on three metrics shown in table 530, which is a weighted sum of the three aspect scores. In turn, the output of interests scoring module 340 is:

Output=Score(Last Access)*Weight(Last Access)+
Score(Frequency)*Weight(Frequency)+Score
(Online Time)*Weight(Online Time)

FIG. 6 is an exemplary diagram depicting various tables that include data utilized by system monitoring recommendation tool 300 to collect dynamic features based on user 390's past usage and access to systems 310.

System monitoring recommendation tool 300 calculates a set of access data according to access times for access records in the past k weeks and generates table 600. Then, system monitoring recommendation tool 300 generates a set of non-access data in table 610 for other time slots (e.g., weekday+hour) in the past k weeks that user 300 did not access. System monitoring recommendation tool 300 extracts the same features from tables 600 and 610, and evaluates their timeslots. In turn, system monitoring recommendation tool 300 clusters table 600 with 610 (see FIG. 7 and corresponding text for further details).

Figure 7:
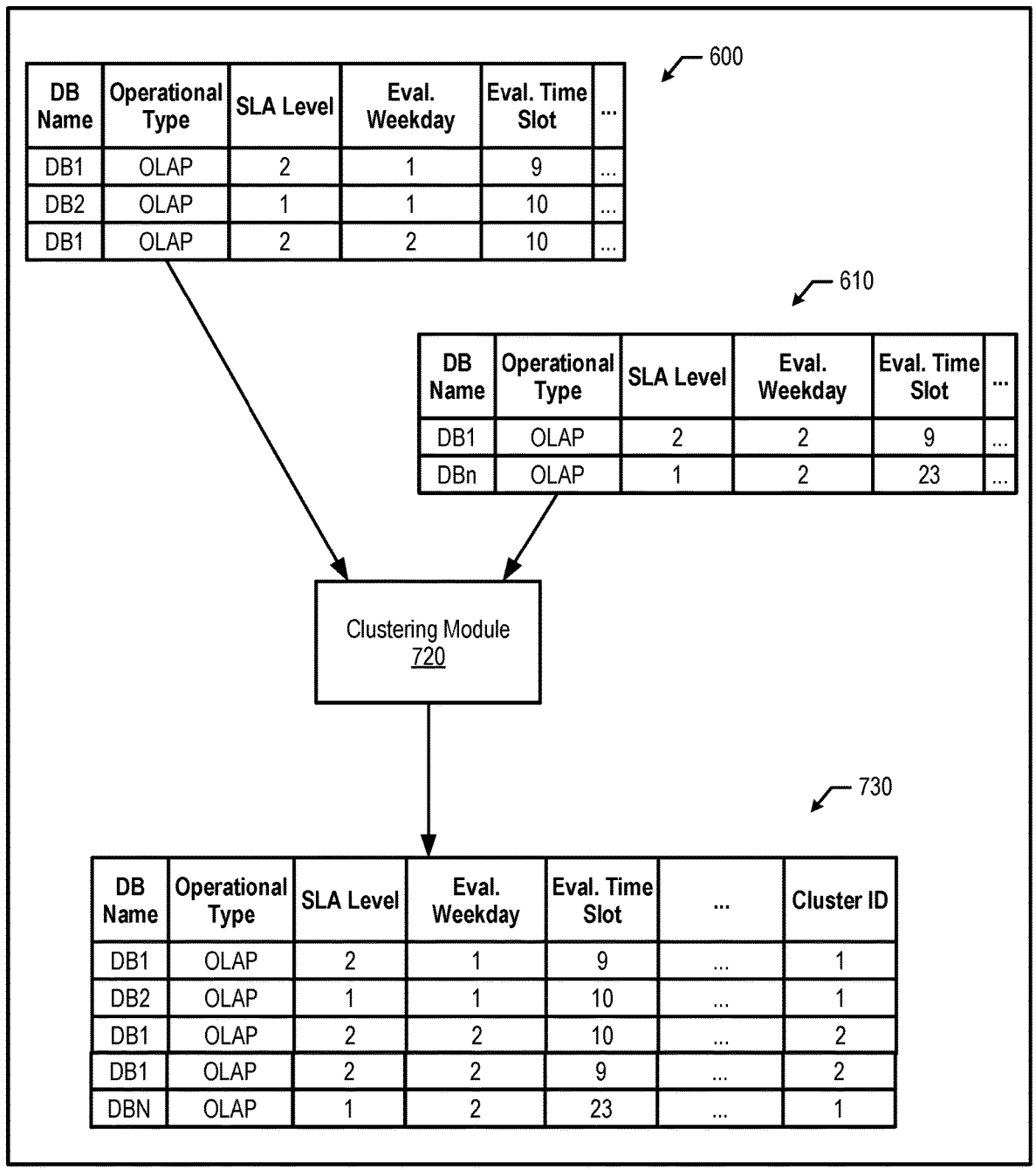
FIG. 7 is an exemplary diagram depicting system monitoring recommendation tool 300 performing a clustering on timeslots according to static and dynamic features.

FIG. 7 is an exemplary diagram depicting system monitoring recommendation tool 300 performing a clustering on timeslots according to static and dynamic features. System monitoring recommendation tool 300 includes clustering module 720, which clusters table 600 with table 610 into table 730, which includes a combined set of feature data. System monitoring recommendation tool 300 then applies a set of historical access rate criteria to table 730 to rate the access durations (see FIG. 8 and corresponding text for further details).

Figure 8:
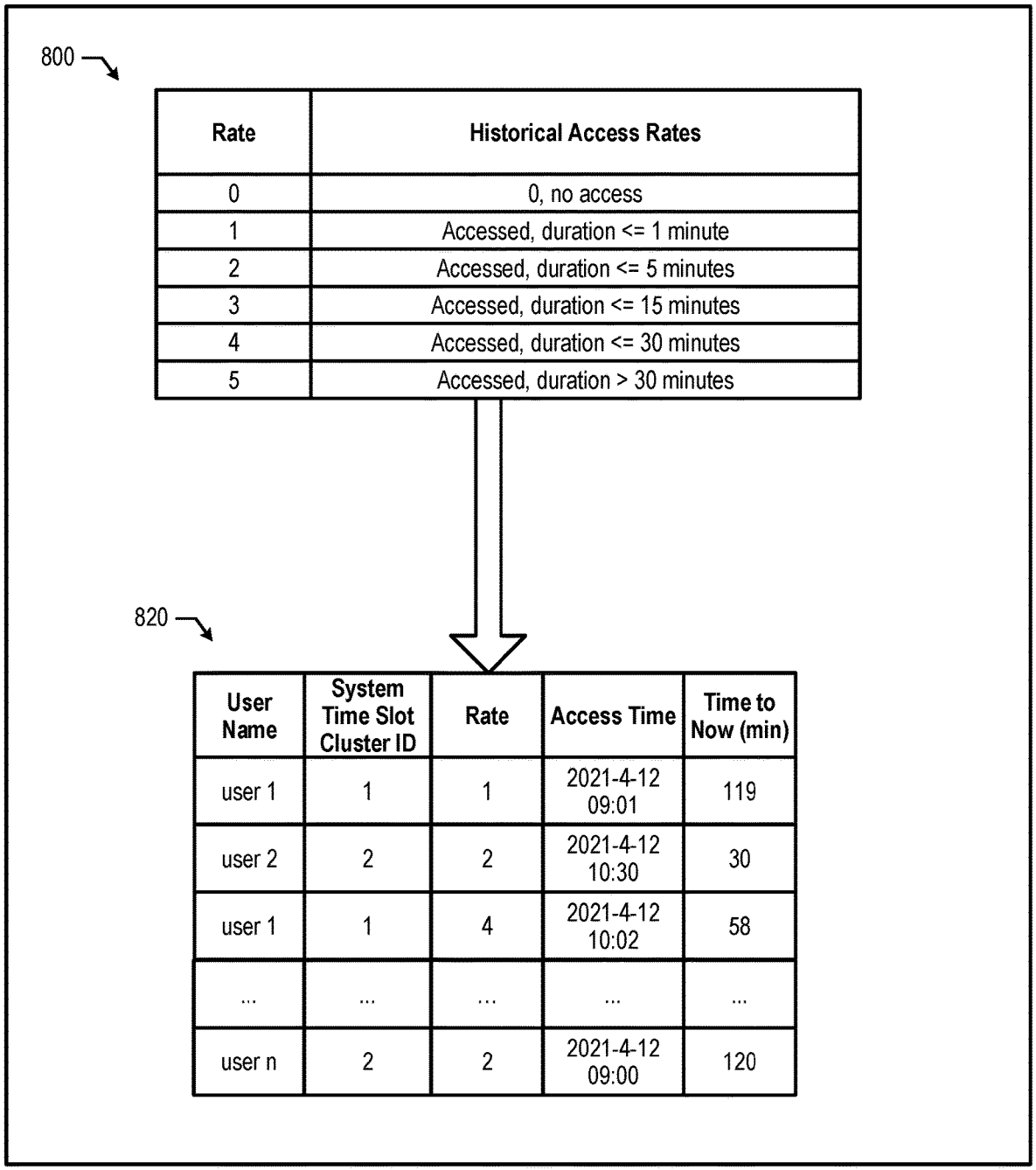
FIG. 8 is an exemplary diagram depicting system monitoring recommendation tool 300 using historical data to calculate access durations and generate a rate matrix based on user, system time slot cluster, and timing data.

FIG. 8 is an exemplary diagram depicting system monitoring recommendation tool 300 using historical access rates to calculate access durations and generate an implicit rate matrix of user 390.

System monitoring recommendation tool 300 calculates, from historical access data, historical durations of access/explores in specific systems, and segments the rates as historical access rate criteria shown in table 800. System monitoring recommendation tool 300 then generates an implicit rate matrix with user and system timeslot cluster, with access times relative to current time (shown in table 820).

In one embodiment, a degree of interest of a system for user 390 is impacted by two factors. The first factor that impacts the degree of interest is that user 390 may access a system_timeslot in one cluster several times, and access some clusters more than other clusters. In addition, instances in one cluster may also impact the degree of interest using the following formula:

$$\text{Cluster\_Interest}(\text{cluster } k, \text{user } i, \text{count of access to cluster}) = \frac{M_{i,k} \sum_{k \in K} N_k}{N_k \sum_{k \in K} M_{i,k}}$$

Using the above formula, when the cluster interest is greater than 1, user i is more interested in cluster k. $M_{i,k}$ is a count of access to cluster k by user i and $N_k$ is a count of system_timeslot in cluster k.

The second factor that impacts the degree of interest is the recent rate reflects user 390's recent interest, while historical rates are less interesting. System monitoring recommendation tool 300 uses the following formula to factor in time decay:

$$\text{TimeDecay } (t: \text{elapsed time from access to now}) = e^{-t/1440}$$

where t is an elapsed time in minutes from the access time to current time; TimeDecay ( ) value is in a range of (0,1], where the time decay value approaches 1 for recent interest, and approaches 0 for historical interest (e.g., seven days ago). In turn, system monitoring recommendation tool 300 generates a time-based implicit rate matrix based on the time decay.

FIG. 9 is an exemplary diagram depicting a table that includes data utilized by system monitoring recommendation tool 300 to compute user similarities with profile data and access rates. In one embodiment, system monitoring recommendation tool 300 computes a user similarity with profile data and access rate data using the following formula:

Similarity=α*sim1(user profile)+(1−α)*sim2(user profile)

where "sim1" is a similarity of user profile on static features vector:

sim1=cos($U_i, U_j$),

"sim2" is a similarity of user access on system_timeslot cluster:

$$sim2 = \frac{\sum_{k \in K}(ri, k - \overline{ri})(rj, k - \overline{rj})}{\sqrt{\sum_{k \in K}(ri, k - \overline{ri})2}\sqrt{\sum_{k \in K}(rj, k - \overline{rj})2}},$$

where K is all clusters, ri,k is average rate of user i for cluster k, and $\overline{ri}$ is an average rate of user i for all access. In the similarity formula above, α is weight how to select a similar user, where a larger number indicates weighting static features similarity and others access behavior similarity.

System monitoring recommendation tool 300 them selects the top N users as neighbors to predict a most possible access system_timeslot cluster rate. Then, system monitoring recommendation tool 300 (final score machine learning model 360) scores all systems from others' access logs. Final score machine learning model 360 receives as input the access log of all users.

Final score machine learning model 360 applies a cluster model to systems 310 with current dynamic features and maps them to a cluster item. Final score machine learning model 360 then calculates user u rate on cluster k, where user m is in the top N neighbors, $r_{m,k,t}$ is the rate time t before user m access on cluster k in the following formula:

$$\text{rate}(u, k) = \overline{ru} + \frac{\sum_{m=1}^{N} \text{similarity}(u, m)(rm, k, t - \overline{rm})f(t)}{\sum_{m=1}^{N} \text{similarity}(u, m)f(t)}$$

Then, final score machine learning model 360 transforms rate(u,k) formula to remove $\overline{ru}$ as delta rate, considering cluster interest(m,k) score interest degree:

$$\text{score}(u, k) = \frac{\sum_{m=1}^{N} \text{similarity}(u, m)(rm, k, t - \overline{rm})f(t)\text{ClusterInterest}(m, k)}{\sum_{m=1}^{N} \text{similarity}(u, m)f(t)}$$

Final score machine learning model 360 then normalizes all cluster scores to get a value in [0,1], which is mapped as a system score output of:

Output=Normalized(score(u,system's cluster id))

FIG. 10 is an exemplary diagram depicting system monitoring recommendation tool 300 computing a final score and retraining the final score machine learning model based on user clicks.

User click monitoring 1010 captures user click response scores 1000, and uses user click response scores to reassign scores (user click feedback 395) for recommended systems as labels to retrain final score machine learning model 360. In turn, system monitoring recommendation tool 300 retrains final score machine learning model 360 according to user click responses 395 to improve sorting capabilities. In one embodiment, system monitoring recommendation tool 300 uses line regression to update the weights of each feature according to user actions.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A computer-implemented method comprising:
   capturing a first user activity log of a first user accessing a plurality of systems in a cloud environment using a cloud management tool, and capturing a set of second user activity logs of a set of second users accessing the plurality of systems in the cloud environment using the cloud management tool;
   determining a set of system monitoring preferences based on the first user activity log and the set of second user activity logs;
   scoring the plurality of systems based on the set of system monitoring preferences, wherein the scoring of a selected one of the plurality of systems includes generating a preferred pace score, wherein the preferred pace score for the selected system is based on a time between a first access and a second access of the selected system by the first user;
   generating a recommended system monitoring list based on the scored plurality of systems, wherein the recommended system monitoring list indicates a set of the plurality of systems to monitor and a recommended sequence in which to monitor the set of the plurality of systems; and
   transmitting the recommended system monitoring list to the first user, wherein the recommended system monitoring list provides the first user with a utilization plan for monitoring the plurality of systems in the cloud environment using the cloud management tool.

2. The computer-implemented method of claim 1 further comprising:
   generating a set of access data based on a first set of access times that the first user accessed the plurality of systems, wherein the set of access data comprises a set of access features;
   generating a set of non-access data based on a second set of access times that the plurality of systems are not accessed by the first user, wherein the set of non-access data comprises the set of access features;
   combining, based on the set of access features, the set of access data with the set of non-access data into a combined set of feature data; and
   utilizing the combined set of feature data in the scoring of the plurality of systems.

3. The method of claim 2 further comprising:
generating an implicit rate matrix by applying a set of historical access rate criteria to the combined set of feature data;
applying a time decay to the implicit rate matrix to generate a time-based implicit rate matrix, wherein the time decay is based on a current time relative to the first set of access times; and
determining a degree of interest of one or more of the plurality of systems by the first user based on the time-based implicit rate matrix.

4. The method of claim 3 further comprising:
utilizing the degree of interest to select the set of second users from a plurality of users.

5. The computer-implemented method of claim 1 further comprising:
determining a set of dynamic features in the plurality of systems;
identifying a set of interests by the set of second users of the set of dynamic features, wherein the set of interests comprises an access count indicating an amount of times that the set of second users accessed the set of dynamic features;
clustering the set of interests into one or more clustered interests; and
utilizing the one or more cluster interests in the scoring of the plurality of systems.

6. The computer-implemented method of claim 1 wherein the scoring of the selected one of the plurality of systems further comprises:
generating an alert/notification score based on a set of alert/notifications initiated by the selected system;
generating an interest score based on an amount of times that the first user accessed the system over a predetermined time period;
generating a similar users' interest score based on an amount of times that the set of second users accessed the selected system over the predetermined time period; and
generating, by a machine learning model, a final score of the selected system in response to inputting the alert/notification score, the preferred pace score, the interests score, and the similar users' interest score into the machine learning model.

7. The computer-implemented method of claim 6 further comprising:
receiving a set of user click feedback in response to transmitting the recommended system monitoring list to the user, wherein the set of user click feedback indicates a set of user preferences of the user relative to the recommended system monitoring list; and
training the machine learning model based on the set of user click feedback.

8. An information handling system comprising:
one or more processors;
a memory coupled to at least one of the processors;
a set of computer program instructions stored in the memory and executed by at least one of the processors in order to perform actions of:
capturing a first user activity log of a first user accessing a plurality of systems in a cloud environment using a cloud management tool, and capturing a set of second user activity logs of a set of second users accessing the plurality of systems in the cloud environment using the cloud management tool;
determining a set of system monitoring preferences based on the first user activity log and the set of second user activity logs;
scoring the plurality of systems based on the set of system monitoring preferences, wherein the scoring of a selected one of the plurality of systems includes generating a preferred pace score, wherein the preferred pace score for the selected system is based on a time between a first access and a second access of the selected system by the first user;
generating a recommended system monitoring list based on the scored plurality of systems, wherein the recommended system monitoring list indicates a set of the plurality of systems to monitor and a recommended sequence in which to monitor the set of the plurality of systems; and
transmitting the recommended system monitoring list to the first user, wherein the recommended system monitoring list provides the first user with a utilization plan for monitoring the plurality of systems in the cloud environment using the cloud management tool.

9. The information handling system of claim 8 wherein the processors perform additional actions comprising:
generating a set of access data based on a first set of access times that the first user accessed the plurality of systems, wherein the set of access data comprises a set of access features;
generating a set of non-access data based on a second set of access times that the plurality of systems are not accessed by the first user, wherein the set of non-access data comprises the set of access features;
combining, based on the set of access features, the set of access data with the set of non-access data into a combined set of feature data; and
utilizing the combined set of feature data in the scoring of the plurality of systems.

10. The information handling system of claim 9 wherein the processors perform additional actions comprising:
generating an implicit rate matrix by applying a set of historical access rate criteria to the combined set of feature data;
applying a time decay to the implicit rate matrix to generate a time-based implicit rate matrix, wherein the time decay is based on a current time relative to the first set of access times; and
determining a degree of interest of one or more of the plurality of systems by the first user based on the time-based implicit rate matrix.

11. The information handling system of claim 10 wherein the processors perform additional actions comprising:
utilizing the degree of interest to select the set of second users from a plurality of users.

12. The information handling system of claim 8 wherein the processors perform additional actions comprising:
determining a set of dynamic features in the plurality of systems;
identifying a set of interests by the set of second users of the set of dynamic features, wherein the set of interests comprises an access count indicating an amount of times that the set of second users accessed the set of dynamic features;
clustering the set of interests into one or more clustered interests; and
utilizing the one or more cluster interests in the scoring of the plurality of systems.

13. The information handling system of claim 8 wherein the processors perform additional actions comprising:
  generating an alert/notification score based on a set of alert/notifications initiated by the selected one of the plurality of systems;
  generating an interest score based on an amount of times that the first user accessed the system over a predetermined time period;
  generating a similar users' interest score based on an amount of times that the set of second users accessed the selected system over the predetermined time period; and
  generating, by a machine learning model, a final score of the selected system in response to inputting the alert/notification score, the preferred pace score, the interests score, and the similar users' interest score into the machine learning model.

14. The information handling system of claim 13 wherein the processors perform additional actions comprising:
  receiving a set of user click feedback in response to transmitting the recommended system monitoring list to the user, wherein the set of user click feedback indicates a set of user preferences of the user relative to the recommended system monitoring list; and
  training the machine learning model based on the set of user click feedback.

15. A computer program product stored in a computer readable storage medium, comprising computer program code that, when executed by an information handling system, causes the information handling system to perform actions comprising:
  capturing a first user activity log of a first user accessing a plurality of systems in a cloud environment using a cloud management tool, and capturing a set of second user activity logs of a set of second users accessing the plurality of systems in the cloud environment using the cloud management tool;
  determining a set of system monitoring preferences based on the first user activity log and the set of second user activity logs;
  scoring the plurality of systems based on the set of system monitoring preferences, wherein the scoring of a selected one of the plurality of systems includes generating a preferred pace score, wherein the preferred pace score for the selected system is based on a time between a first access and a second access of the selected system by the first user;
  generating a recommended system monitoring list based on the scored plurality of systems, wherein the recommended system monitoring list indicates a set of the plurality of systems to monitor and a recommended sequence in which to monitor the set of the plurality of systems; and
  transmitting the recommended system monitoring list to the first user, wherein the recommended system monitoring list provides the first user with a utilization plan for monitoring the plurality of systems in the cloud environment using the cloud management tool.

16. The computer program product of claim 15 wherein the information handling system performs further actions comprising:
  generating a set of access data based on a first set of access times that the first user accessed the plurality of systems, wherein the set of access data comprises a set of access features;
  generating a set of non-access data based on a second set of access times that the plurality of systems are not accessed by the first user, wherein the set of non-access data comprises the set of access features;
  combining, based on the set of access features, the set of access data with the set of non-access data into a combined set of feature data; and
  utilizing the combined set of feature data in the scoring of the plurality of systems.

17. The computer program product of claim 16 wherein the information handling system performs further actions comprising:
  generating an implicit rate matrix by applying a set of historical access rate criteria to the combined set of feature data;
  applying a time decay to the implicit rate matrix to generate a time-based implicit rate matrix, wherein the time decay is based on a current time relative to the first set of access times; and
  determining a degree of interest of one or more of the plurality of systems by the first user based on the time-based implicit rate matrix.

18. The computer program product of claim 17 wherein the information handling system performs further actions comprising:
  utilizing the degree of interest to select the set of second users from a plurality of users.

19. The computer program product of claim 15 wherein the information handling system performs further actions comprising:
  determining a set of dynamic features in the plurality of systems;
  identifying a set of interests by the set of second users of the set of dynamic features, wherein the set of interests comprises an access count indicating an amount of times that the set of second users accessed the set of dynamic features;
  clustering the set of interests into one or more clustered interests; and
  utilizing the one or more cluster interests in the scoring of the plurality of systems.

20. The computer program product of claim 15 wherein the information handling system performs further actions comprising:
  generating an alert/notification score based on a set of alert/notifications initiated by the selected one of the plurality of systems;
  generating an interest score based on an amount of times that the first user accessed the system over a predetermined time period;
  generating a similar users' interest score based on an amount of times that the set of second users accessed the selected system over the predetermined time period;
  generating, by a machine learning model, a final score of the selected system in response to inputting the alert/notification score, the preferred pace score, the interests score, and the similar users' interest score into the machine learning model;
  receiving a set of user click feedback in response to transmitting the recommended system monitoring list to the user, wherein the set of user click feedback indicates a set of user preferences of the user relative to the recommended system monitoring list; and
  training the machine learning model based on the set of user click feedback.

* * * * *